United States Patent [19]

Dempsey

[11] Patent Number: 5,287,994

[45] Date of Patent: Feb. 22, 1994

[54] METERING LIQUID DISPENSER FOR PLANTS

[76] Inventor: James R. Dempsey, 2101 N. Steptoe K-4, Kennewick, Wash. 99336

[21] Appl. No.: 835,759

[22] Filed: Feb. 13, 1992

[51] Int. Cl.$^5$ .............................................. B67D 3/00
[52] U.S. Cl. ................................. 222/158; 222/501; 239/532; 47/48.5; 111/7.1; 111/7.2
[58] Field of Search .................. 47/48.5, 48.5 L; 111/7.1, 7.2, 7.3; 222/158 OR, 613, 501, 505, 507; 239/74, 532, 579

[56] References Cited

U.S. PATENT DOCUMENTS

| | | |
|---|---|---|
| 106,802 | 8/1870 | Fish . |
| 216,808 | 6/1879 | Schrader . |
| 708,126 | 9/1902 | Chase . |
| 919,017 | 4/1909 | Jackson . |
| 947,906 | 2/1910 | Hall . |
| 1,135,346 | 4/1915 | Barnhart . |
| 1,452,110 | 4/1923 | Elliott . |
| 1,772,763 | 8/1930 | Van Riper . |
| 1,868,235 | 7/1932 | Jaden . |
| 2,209,731 | 7/1940 | Holmes . |
| 2,867,943 | 1/1959 | Whitesell . |
| 3,125,255 | 3/1964 | Kaiser . |
| 3,128,915 | 10/1964 | Matter ........................... 222/158 |
| 3,326,306 | 6/1967 | Weir . |
| 3,405,669 | 10/1968 | Nimrick . |
| 3,540,636 | 2/1970 | Dvoracek ....................... 222/501 |
| 3,774,556 | 11/1973 | Poll ................................ 111/7.2 |
| 3,779,430 | 12/1973 | Niki ............................... 222/501 |
| 3,841,349 | 10/1974 | Todd ............................. 47/48.5 |
| 4,170,948 | 10/1979 | Strickland, Jr. . |
| 4,254,717 | 3/1981 | Miller ............................ 111/7.1 |
| 4,267,782 | 5/1981 | Talbott .......................... 111/7.1 |
| 4,267,782 | 5/1981 | Talbott . |
| 4,281,779 | 8/1981 | Shepard ........................ 222/501 |
| 4,429,647 | 2/1984 | Zinck ............................ 111/7.1 |
| 4,432,291 | 2/1984 | Shirley . |
| 4,624,070 | 11/1986 | Query et al. .................. 111/7.1 |
| 4,934,287 | 6/1990 | Guin et al. . |
| 4,982,896 | 1/1991 | Crow ............................ 239/532 |
| 5,050,340 | 9/1991 | Seifert ........................... 47/48.5 |

FOREIGN PATENT DOCUMENTS

| | | | |
|---|---|---|---|
| 272906 | 2/1967 | Australia ....................... 111/7.3 |
| 0670918 | 1/1963 | Canada ......................... 222/501 |
| 2642624 | 3/1978 | Fed. Rep. of Germany ....... 47/48.5 |
| 3712288 | 10/1987 | Fed. Rep. of Germany ...... 222/501 |
| 0858535 | 1/1961 | United Kingdom ............ 222/501 |

Primary Examiner—Carl D. Friedman
Assistant Examiner—Wynn Wood
Attorney, Agent, or Firm—Wells, St. John, Roberts, Gregory & Matkin

[57] ABSTRACT

A dispenser is disclosed including a substantially transparent container or reservoir tube and valving for receiving and selectively dispensing metered quantities of liquid such as water to a plant. A bottom end of the tube is supplied with a valve mechanism that will open upon application of pressure in a axial direction against the ground surface. The valve will reclose upon removal of the axial pressure. An upward end of the container or reservoir tube may be provided with a filler device such as a manually operated water dispensing nozzle. This nozzle may be connected to a source of liquid supply, such as a garden hose. The transparent tube is provided with volume identification markings to facilitate visual identification and dispensation of selected, metered volumes of liquid contained. The discharge volumes may be easily and quickly replenished by the valved filler device.

13 Claims, 3 Drawing Sheets

METERING LIQUID DISPENSER FOR PLANTS

TECHNICAL FIELD

The present invention relates generally to devices for delivering metered quantities of liquids for irrigating or otherwise treating plants.

BACKGROUND OF THE INVENTION

The diminishing water supplies and practical needs for watering plants with predetermined amounts of water lead to the need to deliver precisely metered quantities of water or other treatment liquids to plants. Conservation of water, especially for irrigation purposes is a globally recognized need. Water conservation by selective irrigation of plants intended for harvest or ornamentation has become an objective to varying degrees in the minds of agriculturists from window box gardeners to corporate farmers. Indeed, selective irrigation is desirable even in water rich areas. No one wants to encourage growth of weeds along side a desired crop.

Selective irrigation, albeit on a small scale, has been accomplished in the past by appropriately measuring amounts to be distributed into a watering can or container and delivering the metered amounts directly to the plant.

The above process is effective but quite tedious when there are numerous plants involved. Additionally, watering cans and other dispensing devices often distribute the liquid from a position above the plant concerned. There is therefore a tendency to leave residual water or other treatment liquid on the foliage of the plant. This can be deleterious to the plant. For example, roses and other forms of plants may be damaged or killed by wetting the leaves and flowers in hot weather.

Of course the most popular and perhaps most abused watering method is simply the use of irrigation by a garden hose and sprinkler. This is selective irrigation only of the area of coverage by the sprinkler, and most frequently results in over watering. Sprinklers are not typically suited for watering specific plants, unless all the plants in the coverage area require the same form of irrigation. Sprinklers also wet the foliage and are known to apply water to unneeded areas, such as adjacent building structures and sidewalks.

A need therefore remains for a selective liquid distribution device which will facilitate accurate visually detectable discharge of metered quantities of liquid at specific area on the ground surface and which may be connected to a supply source, such as a garden hose to facilitate repeated, accurate use.

Various apparatus have been produced for injecting quantities of liquid below the ground surface, and for depositing liquids at the ground surface, but lack adequate, repeatable metering capability.

For example, U.S. Pat. No. 106,802 to W. L. Fish discloses a sprinkler that includes a storage container, a downwardly depending spout and a regulated valve at a lower end thereof. A control valve mechanism is selectively operable to open and close the bottom of the discharge end of the spout to control discharge of water. This device is somewhat complicated and does not include an appropriate metering arrangement for determining the volume of water being deposited. Additionally, the valve is manually operable and can therefore accidentally be operated at an elevation above the plant surface so water is deposited onto the foliage.

U.S. Pat. No. 3,405,669 to Nimrick discloses a fertilizer applying irrigation device which combines the function of water injection below the soil surface with a supply fertilizer or other injectable material. This patent is of interest in its use of a manually operable valve and connection to a water hose. However, there is no metering for the water provided for in the device, nor provision for discharge of water responsive to contact with the ground surface.

U.S. Pat. No. 1,868,235 to Jaden discloses a liquid dispensing gun which includes a self-contained reservoir for liquids and a plunger operated dispensing device. The dispensing valving mechanism is extremely complicated, including numerous springs, needle valves, and sealing arrangements.

U.S. Pat. No. 4,254,717 to Miller discloses a irrigation implement comprised of a crook shaped tube with a fitting for attachment to a garden hose. A point is located at an end of the crook, to be pressed into the ground. A manual operable valve is provided at the upward end of the crook to facilitate selective dispensation of water. The device does not include a metering arrangement.

U.S. Pat. No. 4,934,287 to Guin et al. discloses a subterranean injector that includes a pointed end somewhat similar to the Miller arrangement described above, but further includes a mixing tank situated upward of the garden hose connection, to enable mixture of fertilizer into the water being injected into the ground.

U.S. Pat. No. 4,170,948 discloses an apparatus for injecting water into the ground. It includes a hose fitting at an upper end and an eccentric weight on a turbine arrangement toward a lower end. Water is sprayed against the rotor wheel, causing it to rotate. An eccentric weight on the wheel causes vibration and facilitates, by such vibration, insertion of a pointed end of the device into the ground. Another injector, without eccentrics or metering, is disclosed in the 1967 U.S. patent to Weir (U.S. Pat. No. 3,326,306).

U.S. Pat. Nos. 919,017; 947,906; 1,135,346; 1,772,763; 2,209,731; and 2,867,943 all disclose forms of injection devices or weed destroying apparatus that involve the use of elongated liquid storing tubes with valving at bottom ends thereof for selective actuation to dispense fluid. None of these devices makes use of a volume measuring arrangement by which the contained fluids may be selectively metered from the tube.

U.S. Pat. No. 216,808 discloses a plant sprinkler that includes a rubber bulb and valve arrangement useful for siphoning water or other liquids from an attached pail. The device also includes a spray head for sprinkling.

The syringe or bulb in U.S. Pat. No. 216,808 may be considered a metering arrangement. However, there is no visual representation of the amount of liquid being applied, nor an ability to select a precise metered amount. Additionally, the device is connected with a sprinkler as opposed to a mechanism by which carefully metered quantities of water or other fluid are applied to the ground surface directly.

Another injection arrangement with a plunger is shown in U.S. Pat. No. 1,452,110 to Elliott. This arrangement is referred to as a transplanting device and includes an elongated handle with a soil penetrating point at one end and a valved water discharge within the handle adjacent to the pointed end. The valve area is connected to a water supply reservoir. U.S. Pat. No.

708,126 discloses a somewhat similar apparatus only in the shape of a fork with a handle plunger. Again there are no measuring or specific metering capabilities shown.

U.S. Pat. No. 3,125,255 shows a self acting watering device utilized for "drip" irrigation. The device includes a receptacle that is apparently transparent but without calibrations for determining metered release of water. The device is used to slowly drip water into the ground adjacent a plant.

U.S. Pat. No. 4,267,782 discloses a hand held device for forming crop receiving cavities. This patent is of interest in that it shows connection of a trigger type hose nozzle to an elongated tube with a discharge at the bottom end. However, the device includes no metering arrangement, nor a valve for allowing dispersion of liquid upon engagement with the ground surface.

U.S. Pat. No. 4,432,291 to Shirley discloses a water injector with an elongated pipe that is perforated along its length for insertion into the ground surface. The device is connectable to a source of water supply and includes a clear transparent container used to receive a water soluble soil additive for mixture with the injected water. Again, no metering is disclosed.

Of the above references, none show a metering liquid dispenser which facilitates release of metered quantities of liquid by provision of a calibrated volume indicator, or an extremely simple yet effective intake and discharge mechanism. The need for such a device has therefore remained.

BRIEF DESCRIPTION OF THE DRAWINGS

Preferred forms of the present invention are illustrated in the accompanying drawings, in which.

DETAILED DESCRIPTION OF THE PREFERRED EMBODIMENTS

Figure 1:
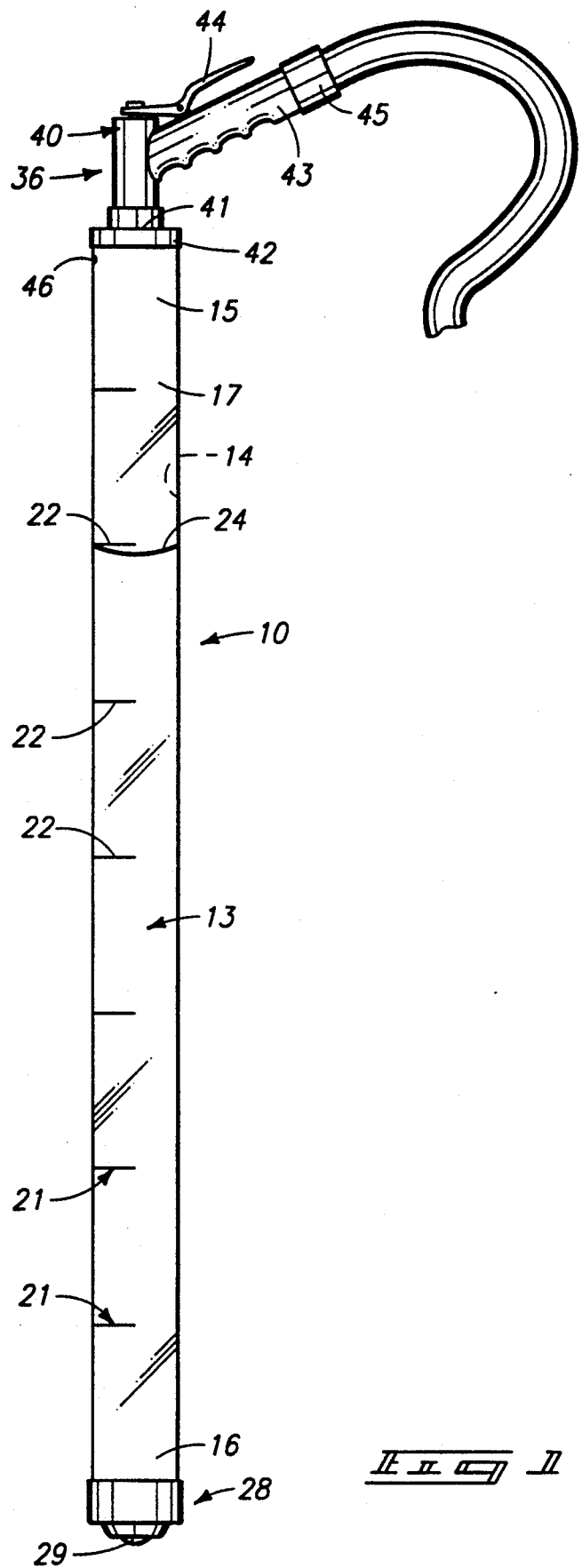
FIG. 1 is a front elevation view of a metering liquid dispenser for plants incorporating features of the present invention.

This disclosure of the invention is submitted in furtherance of the constitutional purposes of the U.S. Patent Laws "to promote the progress of science and useful arts" (Article 1, Section 8).

A metering liquid dispenser exemplifying a preferred form of the present invention is generally shown in the drawings by the reference character 10. The present dispenser 10 is utilized to deposit or dispense desired metered quantities of liquid (usually water) onto the ground surface adjacent to plants for irrigation or soil treatment purposes.

In a first preferred form, the dispenser 10 is especially adapted for connection to a source of liquid to facilitate continued use without requiring periodic refilling. The typical connection is by a garden hose to a conventional water supply.

The present dispenser 10 in the preferred form shown in FIG. 1 includes a container or a reservoir tube 13. In the example shown, the container or reservoir tube 13 is elongated and defines an internal reservoir 14 for receiving liquid therein.

The reservoir 14 extends between a top end 15 and a bottom end 16. A side wall 17 of the reservoir is, in a preferred example, cylindrical. It is also preferable that the side wall 17 include at least a portion of its length that is substantially transparent. A matte or otherwise translucent portion may be used, so long as the contents of the tube remain visible therein. In fact, it is advantageous that the entire side wall 17 be transparent between the top and the bottom ends 15, 16 in order to permit clear visual access to the reservoir contents.

Volume indicia means 21 is provided along the container or reservoir tube 13. The volume indicia means 21 may be provided in the form of calibrated volume identification markings 22 applied directly to the side wall 17.

The identification markings 22 may be provided in any desired form of volume indicia. Such indicia may be provided to identify typical measuring units such as ounces, liters, etc..

A volume within the container or reservoir tube 13 may be measured by holding the tube upright as indicated in FIG. 1. Next, the user visually locates the identification marking 22 most closely associated with the top surface or meniscus 24 of the liquid contained within the tube. This marking identifies the volume of liquid held in the container or tube 13.

A dispenser valve means 28 is provided at the bottom end 16 of container or reservoir tube 13. The dispenser valve means 28 is normally closed to retain liquid within the reservoir. Valve means 28 may be selectively operated to open and dispense liquid in response to pressure applied thereto.

Figure 2:
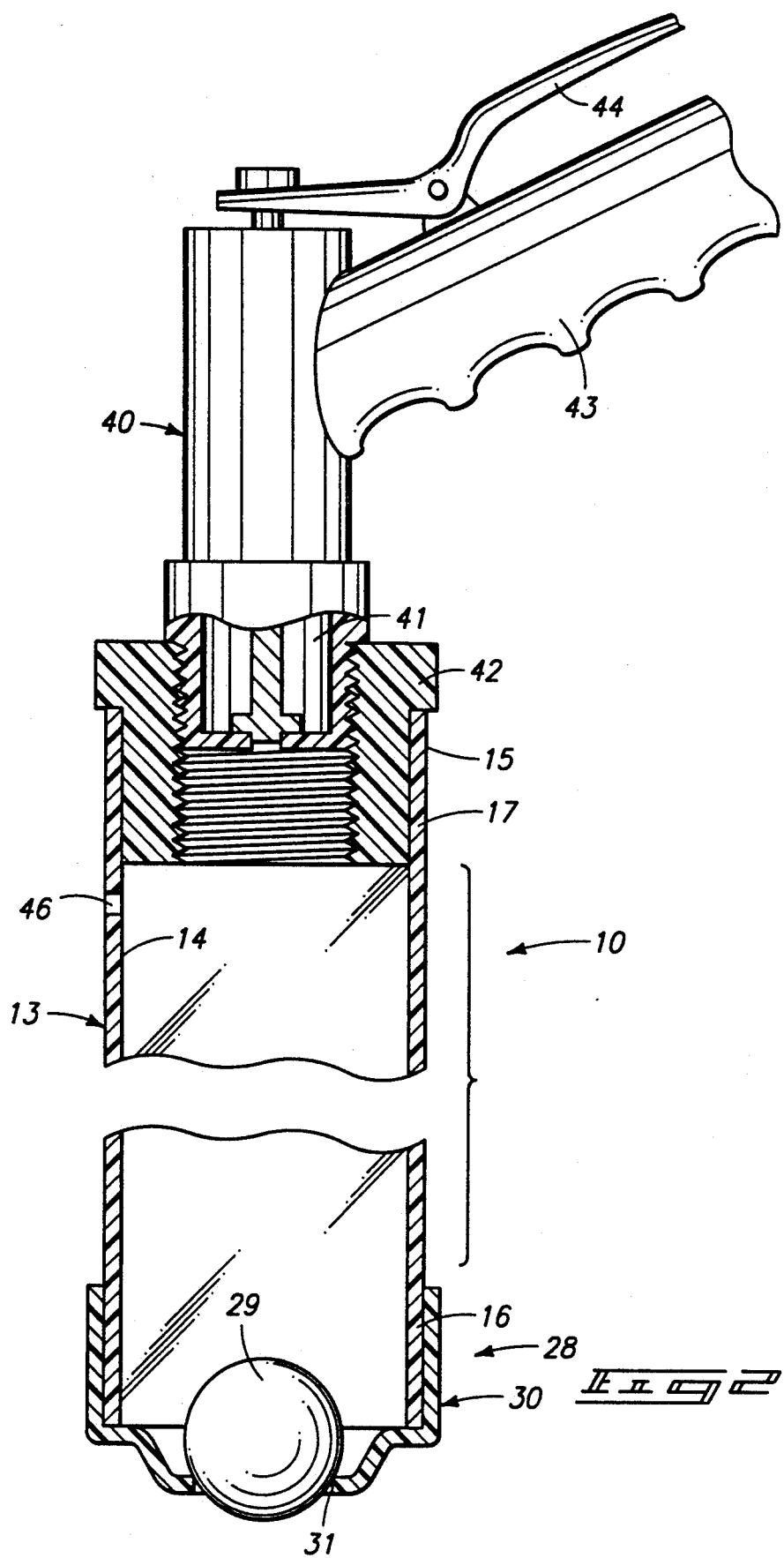
FIG. 2 is an enlarged fragmented view of the dispenser.
Figure 3:
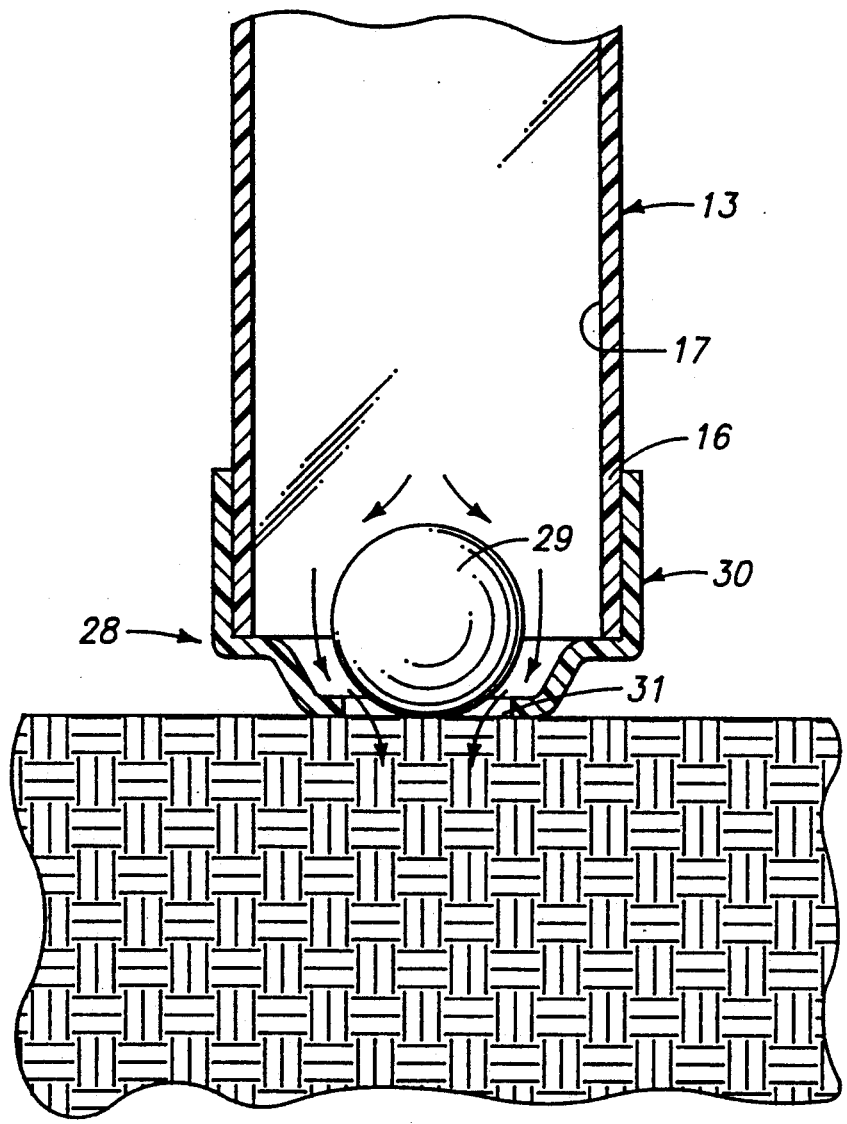
FIG. 3 is a fragmented sectional view of the bottom end of the dispenser illustrating liquid flowing therethrough.

A preferred form of dispenser valve means 28 is generally shown in FIG. 1 and is illustrated in greater detail in FIGS. 2 and 3. The preferred dispenser valve means includes a ball valve. The ball valve may include a ball 29 that is preferably spherical.

The ball 29 is received within a cap member 30. Member 30 includes a circular aperture 31 of a radius less than that of the ball 29 to facilitate seating of the ball as shown in FIG. 2. The cap member also includes a downwardly tapered section to guide the ball 29 into the aperture 31. The ball 29 is received within the cap 30 by the aperture 31 to maintain the valve in a normally closed condition as shown in FIG. 2.

FIG. 3 indicates the valve in an open condition. The open condition is effected by applying an axial pressure against the ball 29, causing it to lift from the aperture 31 and permit liquid to flow through the aperture 31 as indicated by the arrows in FIG. 3.

This may be done in operation simply by pressing the dispenser substantially vertically downward against the ground surface. The downward pressure is sufficient to break the seal, as the ball engages the earth surface and the cap moves on downwardly to also engage the ground surface substantially as shown in FIG. 3.

The ball will again drop into the aperture 31 as the tube is lifted, again sealing the dispenser.

It is advantageous in the preferred form to include a filler means 36 on the elongated reservoir tube member. A preferred form of filler means 36 is adapted for connection to a source of liquid (such as an outdoor water supply by way of a garden hose) for receiving and directing liquid into the internal reservoir.

As an alternative, the filler means may be simply comprised of an opening along the container or reservoir tube by which the container may be periodically replenished with liquid. However, for repeated use, a connection as indicated in the preferred form of FIGS.

1 and 2, is desirable since the tube may be selectively refilled in an easy and expedient manner.

In the illustrated embodiment, FIG. 1 shows the filler means in the form of a pistol grip water spray nozzle 40. The nozzle 40 includes a discharge end 41 that is secured by an adapter 42 to the upper or top end of the reservoir tube 13. A vent hole 46 is situated near the top end of the reservoir adjacent the adapter 40 to minimize back pressure during filling, and to permit relatively free flow of fluid through the dispenser valve means 28 when opened.

The nozzle 40 also includes an angularly oriented handle 43 that extends to one side of the tube 13. An actuator lever 44 is also provided to operate the internal valve arrangement to selectively open and close in varying degree, depending upon the pressure applied to the lever. This form of valving arrangement is conventional and will not be described in detail herein.

The nozzle 40 also includes an intake end 45 that may be selectively secured to a source of liquid supply (garden hose). Again, this form of connector is conventional and need not be described in detail herein.

It is advantageous that the handle 43 extend angularly from the axis of the discharge end 41 and container 13 to provide adequate grip for the user. It is also an advantage that the discharge be situated substantially axially with respect to the container or reservoir 13 to facilitate free flow into the tube and fast effective filling of the tube.

As indicated in FIG. 1, the container or reservoir tube 13 has a length dimension. It is preferred that this dimension be sufficient to allow the user to perform the watering or liquid dispersing functions while standing in an upright orientation.

Thus, the tube may be approximately two and one half to three and one half feet long. Of course, the tube may be produced in considerably longer or shorter variations, depending upon the intended use and the volumes of materials to be dispensed. This is also true of the diameter of the tube.

In practice, a transparent plastic tube having a length dimension of approximately three feet, and a diameter of approximately one and three quarter inches, has been found very useful for irrigating many outdoor plants.

A different size and volume container or reservoir may be provided for use indoors. A container, for use indoors might also be provided without the illustrated nozzle arrangement and simply include a filler means 36 as a top opening in the container, or other access for filling the container from a location near or at the top end as is common with conventional watering pots.

In use, the present dispenser is filled with liquid to a level as desired by visually associating the meniscus 24 of the liquid within the tube with a desired volume indication marking 22. One such relationship is shown in FIG. 1. where one of the markings 22 visibly indicates the present volume within the tube. This volume, is discretionary (within the limits of the reservoir) with the user who is able to selectively control the amount of liquid allowed to enter the tube.

To dispense the liquid, the user holds the tube upright and simply presses the bottom end against the ground surface at the base of a plant selected to receiving the liquid. A slight amount of downward pressure will open the dispenser valve means 28 and allow the liquid to run out onto the ground. The configuration of the tube and the dispenser valve means allow the user to guide the bottom end of the tube through foliage of the plant to the base before the liquid is discharged, thereby avoiding undesired application of liquid to the foliage. The user may observe the amount of liquid being dispensed simply by watching the meniscus 24 move down the tube from one identification marking 22 to the next.

To stop dispensation of liquid from the present device, the user simply lifts the dispenser upwardly. The dispenser valve means 28 will automatically close due to the weight of the ball 29 and pressure of any remaining liquid in the tube.

The above process, may be repeated for numerous plants, with the tube being filled, if needed, after each use simply by selective operation of the filler means 36.

All this is accomplished with the user standing in a comfortable, upright posture and without requiring repeated trips back to a water source. The device thereby achieves the conservation objective of selective irrigation and provides the further advantage of delivering precisely measured quantities of liquid where most needed. Only the desired plants receive the precise quantities of liquid and adjacent plants, such as weeds, receive none.

In compliance with the statute, the invention has been described in language more or less specific as to methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A liquid dispenser for plants, comprising:
    an elongated reservoir tube member, including a top and a bottom end and an internal reservoir extending along the length thereof;
    at least a portion of the elongated reservoir tube member being transparent to allow visual access into the internal reservoir along at least part of the length thereof;
    volume indicia means on the elongated reservoir tube member associated with the transparent portion of the reservoir tube, including volume identification markings for indicating a liquid volume within the reservoir tube by visual alignment of the meniscus of a column of liquid in the reservoir tube with said identification markings;
    dispenser valve means on the bottom end of the tube, normally closed to retain liquid within the reservoir tube member selectively opening responsive to axial force applied thereto in a direction toward the top end of the tube to permit dispensing of liquid from within the elongated reservoir tube member;
    filler means on the elongated reservoir tube member adapted for connection to a source of liquid for receiving and directing liquid into the internal reservoir and;
    a vent adjacent the top end of the tube and opening the internal reservoir to the surrounding atmosphere to facilitate free drainage of liquid from the reservoir responsive to opening of the dispenser valve means.

2. A metering liquid dispenser for plants, as claimed by claim 1 wherein the reservoir tube is substantially transparent.

3. A metering liquid dispenser for plants, as claimed by claim 1 wherein the reservoir tube is transparent and wherein the indicia means includes volume indicating markings along the length of the reservoir tube.

4. A metering liquid dispenser for plants, as claimed by claim 1 wherein the dispenser valve means includes a ball valve at the bottom end of the reservoir tube.

5. A metering liquid dispenser for plants, as claimed by claim 1 wherein the filler means is comprised of a manually operable valve with a discharge connected at the top end of the tube, and an intake adapted for connection to a garden hose.

6. A metering liquid dispenser for plants, as claimed by claim 1 wherein the filler means is comprised of a manually operable valve with a discharge connected at the top end of the tube, and an intake adapted for connection to a garden hose; and
   wherein the dispenser valve means includes a ball valve at the bottom end of the reservoir tube.

7. A metering liquid dispenser for plants, as claimed by claim 1 wherein the reservoir tube is transparent and wherein the indicia means includes volume indicating markings along the length of the reservoir tube; and
   wherein the filler means is comprised of a manually operable valve with a discharge connected to and opening into the top end of the tube, and an intake adapted for connection to a garden hose.

8. A metering liquid dispenser for plants, as claimed by claim 1 wherein the dispenser valve means is comprised of:
   a ball having a radius less that the internal diameter of the internal reservoir, said ball being movably received within the internal reservoir;
   a cap member received over and spanning the bottom end of the tube; and
   wherein said cap member includes a circular aperture therein having a radius less than that of said ball.

9. A metering liquid dispenser for plants, as claimed by claim 1 wherein said tube includes a length dimension of approximately four feet between the top and bottom ends thereof.

10. A metering liquid dispenser for plants, comprising:
    an elongated reservoir tube member formed of a substantially transparent material and including a top and a bottom end and an internal reservoir extending along the length thereof;
    volume indicia means on the elongated reservoir tube member including volume identification markings for indicating a liquid volume within the reservoir tube by visual alignment of the meniscus of a column of liquid in the reservoir tube with said identification markings;
    dispenser valve means including a cap member on the bottom end of the tube, with a circular hole therein;
    a ball releasably seated in the hole to seal the hole under the weight of liquid along the length of the tube above the ball, with a portion of the ball projecting below the cap selectively opening responsive to axial force applied to said portion of the ball to permit free drainage of liquid from within the elongated reservoir tube member; and
    a manually operable filler valve on the elongated reservoir tube member adjacent the top end adapted for connection to a source of liquid, and having a valve actuator manually operable to open and close the filler valve for receiving and directing liquid into the internal reservoir.

11. A metering liquid dispenser for plants, as claimed by claim 10 wherein the manually operable filler valve is comprised of a pistol grip water spray nozzle having a discharge end connected to the tube at the top end thereof and openly communicating with the internal reservoir, and an intake end adapted for connection to a garden hose.

12. A metering liquid dispenser for plants, as claimed by claim 10 wherein the manually operable filler valve is comprised of:
    a pistol grip water spray nozzle having a discharge end and an angularly oriented hand grip adapted for connection the source of liquid;
    an adapter mounted to the tube at the top end thereof mounting the pistol grip water spray nozzle at the discharge end, with said discharge end being substantially axial with the tube and the hand grip projecting angularly therefrom.

13. A metering liquid dispenser for plants, as claimed by claim 10 wherein the manually operable filler valve is comprised of a pistol grip water spray nozzle having a discharge end connected to the tube at the top end thereof and openly communicating with the internal reservoir, and an intake end adapted for connection to a garden hose.

* * * * *